Figure 1:
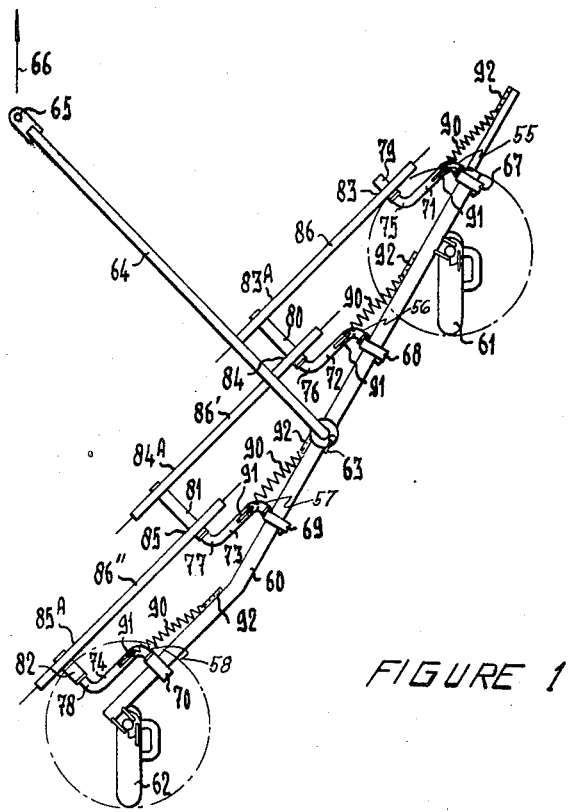

Jan. 26, 1960

C. VAN DER LELY ET AL 2,922,271

SIDE DELIVERY RAKE WITH ELONGATED
ENDLESS RAKING ASSEMBLIES

Original Filed Dec. 3, 1953

United States Patent Office 2,922,271
Patented Jan. 26, 1960

2,922,271

SIDE DELIVERY RAKE WITH ELONGATED ENDLESS RAKING ASSEMBLIES

Cornelis van der Lely and Ary van der Lely, Maasland, Netherlands, assignors to C. van der Lely N.V., Maasland, Netherlands, a Dutch limited company Original application December 3, 1953, Serial No. 395,958, now Patent No. 2,861,413, dated November 25, 1958. Divided and this application October 13, 1958, Serial No. 766,745

18 Claims. (Cl. 56—377)

This invention relates to a device for laterally displacing grass, hay or other material lying on the ground. It is comprised of a frame and a number of endless raking members arranged in overlapping relation and at an angle to the direction of travel of the frame. The raking members are provided with circumferential teeth or similar catching means and are rotated when in operation by the contact of the teeth or similar means with the ground and the hay or other material on the ground.

Known raking devices of this kind generally have rake wheels which are rotatably mounted in the frame. When the raking teeth are rigid and are rigidly secured to the rake wheels, not more than two teeth of each rake wheel will be in contact with the flat surface of the ground at any one time. Thus the working width of the rake wheels is very small. Even if the raking teeth are resilient with lateral deflection, the working width of the rake wheels is relatively restricted unless very large wheels are employed. However, increase in the size of a rake wheel results in considerable weight increase so that there is a limit to the practical size of a rake wheel.

It is an object of this invention to provide a raking device having improved raking members with a considerably increased working width. This and other objects of the invention reside in the fact that corresponding points of the supporting member for the teeth on the side turned towards the ground are situated on lines substantially parallel to the ground over an appreciable distance so that a large number of teeth simultaneously touch the ground or material thereon.

This is a division of our application Serial No. 395,958, now Patent 2,861,413, filed December 3, 1953.

The invention will be explained more in detail with reference to the accompanying drawings.

Figure 2:
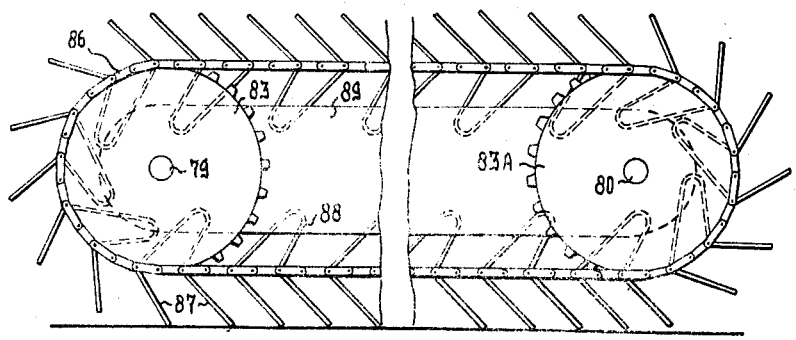

In the drawings:

Figure 1 is a top plan view of the raking device in accordance with our invention; and Figure 2 is a fragmentary front view of one of the raking elements embodied in this invention.

In the figures, a frame beam 60 is provided which is supported near its ends by running wheels 61 and 62. Connected about the middle of frame beam 60 is a draw arm 64 which is rotatable about a vertical axis and may be locked in a desired position with a locking member 63, such as shown in the Patent No. 2,447,354. The draw arm 64 may be hingedly connected at its free extremity 65 to a tractor so as to be movable in all directions and may be pulled forward in the direction of the arrow 66. The beam 60 carries four bearings, 67, 68, 69, and 70 in which the parallel crank shafts 55, 56, 57, and 58 of cranks 71, 72, 73 and 74 are pivotally mounted. The crank pins 75, 76, 77 and 78 of the cranks carry rotatable bushings 79, 80, 81 and 82 which are parallel to each other and to the crank shafts 71, 72, 73 and 74 and which have mounted thereon sprocket wheels 83, 83A and 84, 84A and 85, and 85A respectively. Thus bushing 79 serves as the hub of a sprocket wheel 83, whereas bushing 80 is the hub for two sprocket wheels 83A and 84. In the same manner, bushing 81 serves as the hub of two sprocket wheels 84A and 85, whereas bushing 82 serves as the hub of sprocket wheel 85A.

Sprocket wheels 83 and 83A are coplanar and are rotatably joined by an endless member comprising a chain 86 extending around both of them. Sprocket wheels 84 and 84A are also coplanar and rotatably joined in the same manner by a chain 86' which extends around them. The same is true of sprocket wheels 85 and 85A, similarly joined by chain 86".

As is illustrated in Figure 2, each of the chains 86, 86' and 86" have raking teeth 87 forming the extension of bows 88.

When the raking teeth 87 are pressed backward by their contact with the material or with the ground, their projections or inward extensions 87 find support against a guide 89, by which the raking teeth 88 cannot deviate too much beyond the vertical plane of the wheels 83 and 83A. The guide 89 may be formed by a wide plate extending from one wheel to the other. As is apparent from Figure 2, the guide 89 is laterally mounted on bushings 79 and 80, and is positioned between the sprocket wheels 83 and 83A and the extensions 88 of raking teeth 87, and is, therefore, in effect, substantially coplanar with the sprocket chain 86.

In Figure 1, the chain 86 around sprocket wheels 83 and 83A is caused to move by contact of the teeth 87 with the ground and material is delivered to the left. The material then comes before the chain 86' running over sprocket wheels 84 and 84A, which cause it to be discharged to the last chain 86" on sprocket wheels 85 and 85A. This last chain 86" delivers the material to the left of sprocket wheel 85A.

The pressure of the teeth on the ground may be adjusted by changing the tension of the springs 90 which are fixed with an extremity to the upper end of arms 91 mounted at right angles to cranks 71, 72, 73 and 74. For this purpose, the beam 60 is provided for each spring with a number of holes 92, into which the spring may be hooked.

We claim:

1. A raking member for a device for laterally displacing grass, hay or other material lying on the ground, comprising at least two rotatable sprockets transversely disposed in substantially the same vertical plane, an endless member extending around said sprockets, raking teeth attached to and extending outwardly from said member, said raking teeth each having an inwardly extending portion, a hub attached to each of said sprockets, and at least one guide extending transversely from the hub of one of said sprockets to the hub of the adjacent sprocket and being operatively associated with each of said hubs, said guide being disposed immediately forward of the inward portions of said raking teeth and providing a bearing surface for said inward portions.

2. A raking member according to claim 1 wherein the inward portions of at least two of said raking teeth join at their inward extremity, said two raking teeth and the corresponding inward portions being comprised of a single resilient wire.

3. A raking member according to claim 1 wherein said member is connected to a frame by means of cranks, each of such cranks having a crank shaft pivotally secured to the frame and a crank pin having one or more sprockets rotatably mounted thereon.

4. A raking member according to claim 3 with resilient means interposed between said cranks and the frame.

5. A device for laterally displacing grass, hay or other material lying on the ground, comprising a frame and a plurality of rotatable raking members interconnected to said frame, said raking members being rotated by contact with the surface being raked when the device is moved over said surface, at least one of said raking members consisting of at least two rotatable sprockets transversely disposed in substantially the same vertical plane and an endless chain extending around said sprockets with raking teeth attached to and extending outwardly from said chain, inward teeth extensions connected to said chain, a lateral guide for said extensions disposed between said sprockets and interconnected to said frame, a hub for each of said sprockets, pins extending through each of said hubs, and crank means attached to each of said pins, said raking member being movably mounted on said frame by said crank means.

6. A device according to claim 5 wherein said cranks are connected on one end to said pins and at the other end to crank shafts pivotally mounted in bearings in said frame.

7. A device according to claim 6 wherein resilient means are interposed between each of said cranks and said frame.

8. A device according to claim 5 wherein each of said raking teeth have an inwardly extending portion.

9. A device according to claim 8 wherein said guide part extends transversely from the hub of one of said sprockets to the hub of the adjacent sprocket, said guide part being disposed immediately forward of the inward portions of said raking teeth and providing a bearing surface for said inward portions.

10. A device for laterally displacing grass, hay or other material lying on the ground, comprising a frame and a plurality of overlapping rotatable raking members interconnected to said frame, said raking members being rotated by contact with the surface being raked when the device is moved over said surface, each of said raking members consisting of two rotatable sprockets transversely disposed in the same vertical plane and an endless chain extending around said sprockets with raking teeth attached to and extending outwardly from said chain, inward projections from said chain, guide means for said projections disposed substantially between said sprockets and interconnected to said frame a hub for each sprocket, pins extending through each of said hubs, and cranks interconnecting said pins and said frame.

11. A device according to claim 10 wherein an axis through the center of a hub of an inboard sprocket of at least one raking member extends through the center of the hub of the sprocket of an overlapping raking member.

12. A device according to claim 10 wherein an inboard sprocket of at least one raking member is coupled to the sprocket of an overlapping raking member.

13. A device according to claim 10 wherein an inboard sprocket of at least one raking member is fixedly attached to the sprocket of an overlapping raking member.

14. A device for laterally displacing grass, hay or other material lying on the ground, comprising a frame having a draw bar, said draw bar being movably connected to said frame, a plurality of running wheels attached to and supporting said frame, a plurality of overlapping raking members movably interconnected to said frame, each having at least two sprockets transversely disposed in the same vertical plane and an endless chain extending around said sprockets with raking teeth attached to and extending outwardly from said chain, the chain of each of said raking members having inwardly extending projections, and a guide part extending from at least the center of one of said sprockets to at least the center of an adjacent sprocket on each of said raking members and being operatatively associated with each of said sprockets, each of said guide parts being disposed immediately forward of the inwardly extending projections on the chain of each raking member thereby providing a bearing surface for said projections.

15. A device according to claim 14 wherein the sprockets of said raking members freely revolve on axles which are movably connected to said frame.

16. A device according to claim 15 wherein the adjacent sprocket of at least two overlapping raking members revolve on the same axle.

17. A device according to claim 16 wherein said adjacent sprockets are coupled to each other.

18. A device for laterally displacing grass, hay or other material lying on the ground, comprising a frame, at least two cranks, at least two sprockets having hubs, said cranks each comprising a crank shaft pivotally secured to said frame and a crank pin, each crank pin having at least one of said sprockets rotatably mounted thereon at its hub, an endless member extending around said sprockets, and raking teeth attached to and extending outwardly from said member.

References Cited in the file of this patent

UNITED STATES PATENTS

| | | |
|---|---|---|
| 2,385,829 | Melroe | Oct. 2, 1945 |
| 2,680,343 | Enos | June 8, 1954 |
| 2,735,256 | West | Feb. 21, 1956 |